(12) United States Patent
Suzuki

(10) Patent No.: US 6,320,698 B1
(45) Date of Patent: Nov. 20, 2001

(54) ZOOM LENS WITH VIBRATION REDUCTION FUNCTION

(75) Inventor: Kenzaburo Suzuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/348,811

(22) Filed: Nov. 28, 1994

(30) Foreign Application Priority Data

Nov. 29, 1993 (JP) .................................................... 5-323283

(51) Int. Cl.$^7$ .............................. G02B 27/64; G02B 15/14
(52) U.S. Cl. ........................... 359/557; 359/554; 359/686
(58) Field of Search .................................. 359/554–557, 359/676–677, 683, 686, 738–740

(56) References Cited

U.S. PATENT DOCUMENTS

| | | | | |
|---|---|---|---|---|
| 3,771,853 | * | 11/1973 | Nakamura | 359/686 |
| 4,591,235 | * | 5/1986 | Tokumaru et al. | 359/686 |
| 4,653,873 | * | 3/1987 | Kawamura | 359/686 |
| 4,978,205 | * | 12/1990 | Sato | 359/557 |
| 5,069,537 | * | 12/1991 | Kitagishi | 359/557 |
| 5,182,671 | * | 1/1993 | Kitagishi et al. | 359/557 |
| 5,249,079 | * | 9/1993 | Umeda | 359/557 |

FOREIGN PATENT DOCUMENTS

| | | |
|---|---|---|
| 1-189621 | 7/1989 | (JP) . |
| 1-191113 | 8/1989 | (JP) . |
| 1-284823 | 11/1989 | (JP) . |

* cited by examiner

Primary Examiner—Thong Nguyen
(74) Attorney, Agent, or Firm—Miles & Stockbridge P.C.

(57) ABSTRACT

A zoom lens includes in the following order from the object side, a first lens group having a negative refracting power, a second lens group having a positive refracting power, a third lens group having a negative refracting power, and a fourth lens group having a positive refracting power. The zoom lens has a displacement mechanism for attaining vibration reduction by moving the third lens group or a partial lens group in the third lens group in a direction substantially perpendicular to an optical axis. When zooming is effected from a wide-angle end to a telephoto end, an interval between the first and second lens groups decreases, an interval between the second and third lens groups increases, and an interval between the third and fourth lens groups decreases. The zoom lens satisfies the following condition:

$$0.2 < |f3|/(fW \cdot fT)^{1/2} < 5$$

where f3 is the focal length of the third lens group, fW is the focal length of the entire lens system at the wide-angle end, fT is the focal length of the entire lens system at the telephoto end.

1 Claim, 9 Drawing Sheets

ZOOM LENS WITH VIBRATION REDUCTION FUNCTION

BACKGROUND OF THE INVENTION

1. Field of the Invention

The present invention relates to a zoom lens with a vibration reduction function and, more particularly, to a vibration reduction method for zoom lenses for a still camera, video camera, and the like.

2. Related Background Art

A conventional zoom lens with a vibration reduction function corrects a variation in image position caused by, e.g., a camera shake by moving an arbitrary lens group in the zoom lens constituted by two or more lens groups in a direction substantially perpendicular to the optical axis, as described in Japanese Laid-Open Patent Application Nos. 1-189621 and 1-191113. Also, another zoom lens with a vibration reduction function corrects a variation in image position caused by, e.g., a camera shake by moving a partial lens group in a fixed first lens group upon zooming in a direction substantially perpendicular to the optical axis, as described in Japanese Laid-Open Patent Application No. 1-284823.

Note that correcting a variation in image position caused by, e.g., a camera shake by moving the lens group in a direction substantially perpendicular to the optical axis will be referred to as "vibration reduction" in this specification.

However, the above-mentioned prior arts are not suitable for a lens for a still camera or a video camera since a sufficient back focus cannot be assured and a large zoom ratio cannot be realized for a lens for a single-lens reflex camera or a lens for a video camera.

SUMMARY OF THE INVENTION

The present invention has been made in consideration of the above situation and has as an object to provide a high-performance zoom lens for a still camera or a video camera, which provides high performance especially from a normal range to a wide-angle range.

In order to achieve the above object, according to the present invention, a zoom lens, which comprises, in the following order from the object side, a first lens group G1 having a negative refracting power, a second lens group G2 having a positive refracting power, a third lens group G3 having a negative refracting power, and a fourth lens group G4 having a positive refracting power, and in which when zooming is effected from the wide-angle end to the telephoto end, the interval between the first and second lens groups G1 and G2 decreases, the interval between the second and third lens groups G2 and G3 increases, and the interval between the third and fourth lens groups G3 and G4 decreases, comprises displacement means for attaining vibration reduction by moving the third lens group G3 or a partial lens group in the third lens group G3 in a direction substantially perpendicular to the optical axis, and satisfies the following condition:

$$0.2 < |f3|/(fW \cdot fT)^{1/2} < 5$$

where fW is the focal length of the entire lens system at the wide-angle end, fT is the focal length of the entire lens system at the telephoto end, and f3 is the focal length of the third lens group G3.

According to a preferred aspect of the present invention, the zoom lens satisfies:

$$0.3 < |f2/f1| < 3$$

where f1 is the focal length of the first lens group G1, and f2 is the focal length of the second lens group G2. A stationary flare stop for shielding unnecessary rays upon movement of the third lens group G3 in the direction substantially perpendicular to the optical axis for vibration reduction is preferably arranged on the optical axis.

The zoom lens of the present invention adopts the following arrangement to be suitable for a zoom lens for a still camera or a video camera. That is, the zoom lens comprises, in the following order from the object side, the first lens group G1 having a negative refracting power, the second lens group G2 having a positive refracting power, the third lens group G3 having a negative refracting power, and the fourth lens group G4 having a positive refracting power, and when zooming is effected from the wide-angle end to the telephoto end, the interval between the first and second lens groups G1 and G2 decreases, the interval between the second and third lens groups G2 and G3 increases, and the interval between the third and fourth lens groups G3 and G4 decreases.

The characteristic features of the zoom lens with the above arrangement are that (i) the lens is suitable for achieving a lens having a wider angle, (ii) the lens is suitable for achieving a lens having a higher magnification, and (iii) the back focus can be easily assured.

With these excellent characteristics, the zoom lens with the above arrangement is widely used as zoom lenses for still cameras and video cameras.

The present invention provides optimal conditions for attaining vibration reduction while assuring good imaging performance for a zoom lens of this type.

DETAILED DESCRIPTION OF THE INVENTION

In general, in a zoom lens which is used for a normal range and a wide-angle range, and includes a negative lens group at the most object side, a first lens group at the most object side is the largest in size, and is normally extended toward the object side upon focusing. For this reason, when the first lens group is selected as a correction optical system which is displaced in the direction perpendicular to the optical axis for vibration reduction, the holding and driving mechanisms are undesirably complicated and become bulky.

Therefore, in the zoom lens of the present invention as well, it is not preferable to select the first lens group as a vibration reduction optical system.

In the zoom lens with the arrangement of the present invention, when a lens group such as the second or fourth lens group which has a large moving amount in the optical axis direction upon zooming is selected as the vibration reduction optical system, the holding and driving mechanisms are undesirably complicated and become bulky. Therefore, it is not preferable to select the second or fourth lens group as the vibration reduction optical system.

On the other hand, the third lens group can have a relatively small lens diameter, the moving amount, in the optical axis direction, of the third lens group upon zooming can be reduced, and the third lens group can be fixed during zooming. In addition, as will be described later, the present inventor confirmed that the aberration characteristics upon vibration reduction deteriorated less when the third lens group was selected as the vibration reduction optical system.

For these reasons, in order to simplify the mechanism (holding and driving mechanisms) of the entire lens system and to assure good imaging performance upon vibration reduction, displacement means for attaining vibration reduction is arranged in the third lens group G3.

According to the present invention, in addition to the above-mentioned arrangement, the zoom lens satisfies the following conditional formula (1):

$$0.2 < |f3|/(fW \cdot fT)^{1/2} < 5 \quad (1)$$

where fW: the focal length of the entire lens system at the wide-angle end fT: the focal length of the entire lens system at the telephoto end f3: the focal length of the third lens group G3

Conditional formula (1) defines an appropriate range in association with the focal length fW of the zoom lens at the wide-angle end, the focal length fT of the zoom lens at the telephoto end, and the focal length f3 of the third lens group G3.

When the ratio of these focal lengths is set to be smaller than the lower limit value of conditional formula (1), the total length of the lens becomes large and disturbs a compact structure. In addition, the lens diameters of the lens groups at the image side of the third lens group G3 undesirably increase. Furthermore, the spherical aberration at the telephoto end tends to become excessive in the positive direction.

On the contrary, when the ratio of these focal lengths exceeds the upper limit value of conditional formula (1), the focal length f3 of the third lens group G3 becomes too large, the spherical aberration at the telephoto end tends to become excessive in the negative direction, and it becomes difficult to assure the back focus.

Note that the imaging performance can be further improved by setting the upper limit value of conditional formula (1) to be 2.5 or less, and its lower limit value to be 0.5 or more.

In order to further improve the imaging performance, the zoom lens preferably satisfies the following conditional formula (2) in addition to the above-mentioned condition:

$$0.3 < f2/|f1| < 3 \quad (2)$$

where f1: the focal length of the first lens group G1 f2: the focal length of the second lens group G2

Conditional formula (2) defines an appropriate refracting power ratio between the focal length f2 of the second lens group G2 and the focal length f1 of the first lens group G1.

When the ratio is set to be smaller than the lower limit value of conditional formula (2), the spherical aberration at the telephoto end tends to become excessive in the negative direction. In addition, since the Petzval sum tends to become excessive in the positive direction, the astigmatism and the curvature of field increase.

On the contrary, when the ratio exceeds the upper limit value of conditional formula (2), the spherical aberration at the telephoto end tends to become excessive in the positive direction, a variation in coma upon zooming becomes large, and the distortion at the telephoto end tends to excessively shift in the negative direction.

Note that the imaging performance can be further improved by setting the upper limit value of conditional formula (2) to be 1.5 or less, and its lower limit value to be 0.5 or more.

In order to further improve the imaging performance, the zoom lens preferably satisfies the following conditional formulas (3) to (5) in addition the above-mentioned conditions:

$$\Delta S3/|f3| < 0.1 \quad (3)$$

$$-8 < R31/|f3| < 0 \quad (4)$$

$$L/|f3| < 0.4 \quad (5)$$

where $\Delta S3$: the maximum displacement amount, in the direction perpendicular to the optical axis, of the third lens group G3 upon vibration reduction R31: the radius of curvature of the surface, at the most object side, of the third lens group G3

L: the on-axis thickness of the third lens group G3

Conditional formula (3) defines an appropriate range in association with the ratio between the maximum displacement amount of the third lens group G3 upon vibration reduction and the focal length f3 of the third lens group G3.

When the ratio exceeds the upper limit value of conditional formula (3), the maximum displacement amount of the third lens group G3 becomes too large, and the aberration variation amount upon vibration reduction becomes large. In particular, at a peripheral position on the image plane, the difference, in the optical axis direction, between the best imaging plane in the meridional direction and the best imaging plane in the sagittal direction increases.

In addition, the astigmatism near the center on the image plane at the telephoto end tends to become large.

Conditional formula (4) defines an appropriate range in association with the ratio between the radius of curvature of the surface, at the most object side, of the third lens group G3 and the focal length f3 of the third lens group G3.

When the ratio falls outside the range (defined by the upper and lower limit values) of conditional formula (4), variations in spherical aberration, curvature of field, and astigmatism increase upon zooming.

Upon vibration reduction as well, variations in spherical aberration and coma increase.

Note that the imaging performance can be further improved by setting the upper limit value of conditional formula (4) to be −1 or less, and its lower limit value to be −3 or more.

Conditional formula (4) defines an appropriate range in association with the ratio between the on-axis thickness of the third lens group G3 and the focal length f3 of the third lens group G3.

When the ratio exceeds the upper limit value of conditional formula (5), the on-axis thickness of the third lens group G3 as a vibration reduction lens group becomes too large, and the mechanism for vibration reduction may become bulky and complicated.

Upon constitution of an actual third lens group G3, in addition to the above-mentioned conditions, the zoom lens desirably satisfies the following conditional formulas (6) and (7):

$$1.5 < N- \quad (6)$$

$$50 < \nu- \quad (7)$$

where

N–: the maximum one of refractive indices of negative lens components in the third lens group G3

$\nu$–: the minimum one of Abbe's numbers of the negative lens components in the third lens group G3

When the refractive index is set to be smaller than the lower limit value of conditional formula (6), at both the wide-angle end and the telephoto end, the spherical aberration tends to become excessive in the positive direction, and the distortion becomes large in the positive direction. In addition, since the Petzval sum tends to shift in the negative direction, a large positive curvature of field tends to be generated.

On the other hand, when the Abbe's number is set to be smaller than the lower limit value of conditional formula (7), at both the wide-angle end and the telephoto end, the on-axis chromatic aberration at short wavelengths tends to become excessive in the positive direction.

In order to further improve the imaging performance, in addition to the above-mentioned conditions, the zoom lens preferably satisfies the following conditional formulas (8) to (10):

$$0.3 < |f3|/f4 < 2 \quad (8)$$

$$-5 < q- < 1.5 \quad (9)$$

$$\Delta S3/D < 0.05 \quad (10)$$

where f4: the focal length of the fourth lens group G4 q–: the shape factor of a negative lens at the most object side in the third lens group G3

D: the effective diameter of the surface at the most object side in the third lens group G3

Note that the shape factor q is given by the following equation (a) when the radius of curvature of the surface, at the object side, of a lens is represented by R1, and the radius of curvature of the surface, at the image side, of the lens is represented by R2:

$$q = (R2 + R1)/(R2 - R1) \quad (a)$$

Conditional formula (8) defines an appropriate range in association with the ratio between the focal length of the third lens group G3 and that of the fourth lens group G4.

When the ratio exceeds the upper limit value of conditional formula (8), the spherical aberration at the telephoto end becomes large in the negative direction, and a variation in coma of rays above the principal ray becomes large upon zooming.

On the contrary, when the ratio is set to be smaller than the lower limit value of conditional formula (8), the astigmatism at the wide-angle end becomes large, the spherical aberration at the telephoto-end largely shifts in the positive direction, and the Petzval sum tends to shift in the negative direction.

Conditional formula (9) defines an appropriate range in association with the shape factor of the negative lens at the most object side in the third lens group G3.

When the shape factor falls outside the range of conditional formula (9), at both the wide-angle end and the telephoto end, the spherical aberration tends to become excessive in the positive direction.

In addition, a variation in coma of rays above the principal ray becomes large upon zooming.

Conditional formula (10) defines an appropriate condition associated with the ratio between the maximum displacement $\Delta S3$, in the direction perpendicular to the optical axis, of the third lens group G3 upon vibration reduction, and the effective diameter D of the surface at the most object side in the third lens group G3.

When the ratio exceeds the upper limit value of conditional formula (10), the maximum displacement amount in the direction perpendicular to the optical axis upon vibration reduction becomes too large with respect to the effective diameter, and stray light tends to be mixed upon vibration reduction. By arranging a stationary flare stop on the optical axis, the mixing of stray light can be eliminated.

In order to further improve the imaging performance, in addition to the above-mentioned conditions, the zoom lens preferably satisfies the following conditional formula (11):

$$-0.1 < \Delta 3/(fW \cdot fT)^{1/2} < 0.3 \quad (11)$$

where $\Delta 3$: the moving amount, in the optical axis direction, of the third lens group G3 upon zooming Note that the positive sign of the moving amount $\Delta 3$ indicates movement toward the object side, and the negative sign indicates movement toward the image side.

Conditional formula (11) defines an appropriate range in association with the focal length fW of the zoom lens at the wide-angle end, the focal length fT of the zoom lens at the telephoto end, and the moving amount $\Delta 3$, in the optical axis direction, of the third lens group G3 upon zooming.

When the ratio of these values falls outside the range of conditional formula (11), the moving amount, in the optical axis direction, of the third lens group G3 upon zooming becomes too large. More specifically, since the third lens group G3 includes a mechanism (displacement means) for vibration reduction, the mechanism of the zoom lens as a whole may become complicated.

More preferably, the mechanism can be simplified by keeping the third lens group fixed in the optical axis direction upon zooming (i.e., $\Delta 3 = 0$).

When a stationary flare stop is arranged on the optical axis in addition to an aperture stop, unnecessary light upon displacement of the lens group across the optical axis for vibration reduction can be shielded, and generation of a ghost and unnecessary exposure can be avoided.

The negative lens, at the most object side, of the first lens group G1 preferably comprises a negative meniscus lens having a convex surface facing the object side.

Furthermore, when the third lens group G3 is constituted by a single lens (which can be a cemented lens consisting of plural lenses), the lens preferably has a biconcave shape.

Moreover, when the third lens group G3 is constituted by three lenses (which can be a cemented lens consisting of plural lenses), the third lens group preferably comprises, in the following order from the object side, a positive lens, a negative lens, and a negative lens.

When an aspherical surface is used in the third lens group G3, the imaging performance can be further improved upon zooming and vibration reduction.

Also, the aperture stop is preferably arranged near the third lens group G3.

In each of the embodiments of the invention, a zoom lens with a vibration reduction function according to the present invention, which comprises, in the following order from the object side, a first lens group G1 having a negative refracting power, a second lens group G2 having a positive refracting power, a third lens group G3 having a negative refracting power, and a fourth lens group G4 having a positive refracting power, and in which when zooming is effected from the wide-angle end to the telephoto end, the interval between the first and second lens groups G1 and G2 decreases, the interval between the second and third lens groups G2 and G3 increases, and the interval between the third and fourth lens groups G3 and G4 decreases, comprises a displacement means 1 for attaining vibration reduction by moving the third lens group G3 in a direction substantially perpendicular to the optical axis.

Preferred embodiments of the present invention will be described below with reference to the accompanying drawings.

First Embodiment

Figure 1:
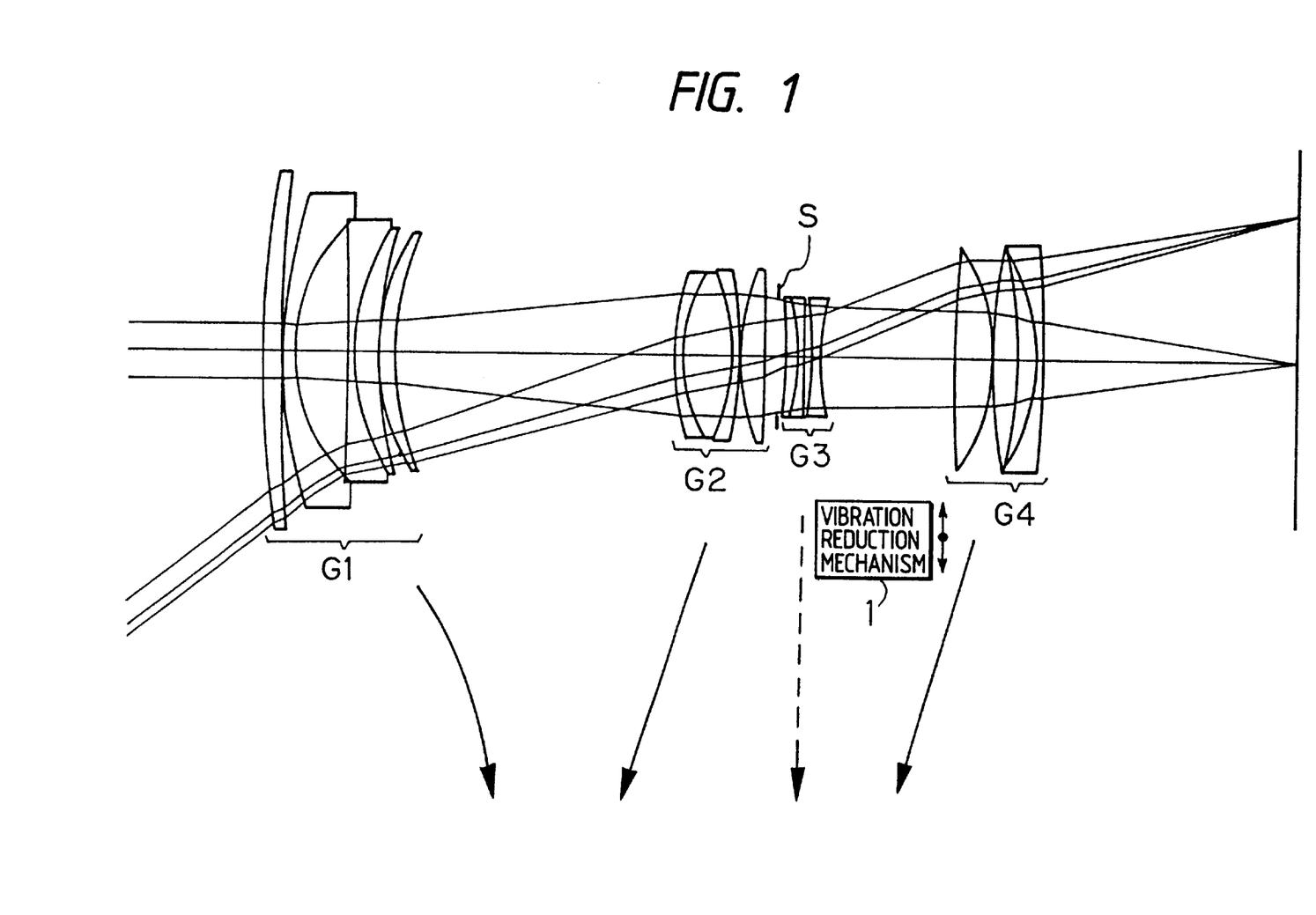
FIG. 1 is a view showing the arrangement of a zoom lens according to t first embodiment of the present invention.
Figures 2A, 2B, 2C:
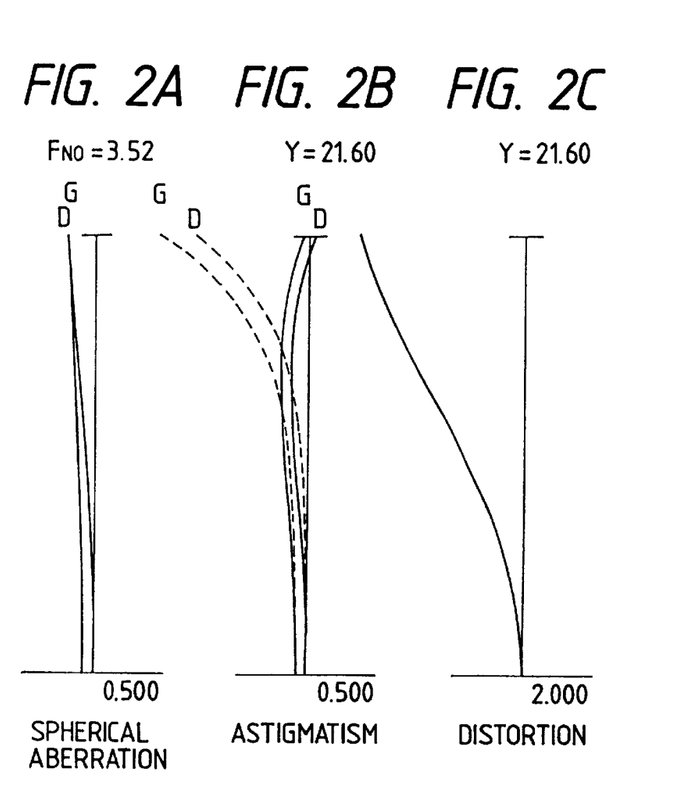
FIGS. 2A to 2E are graphs showing aberrations at the wide-angle end in the first embodiment shown in FIG. 1.
Figure 2D:
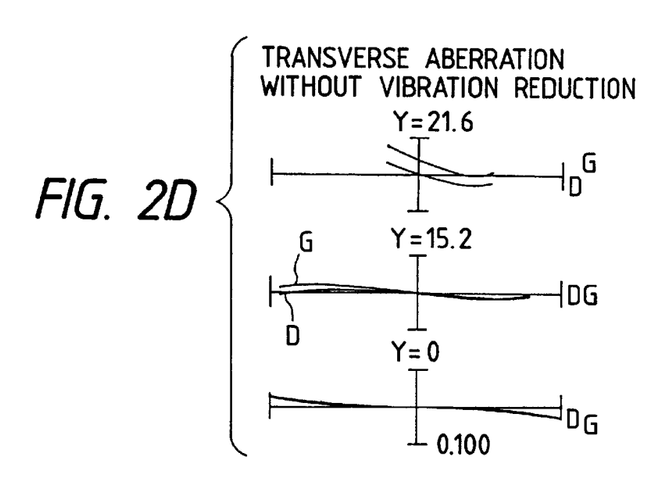
Figure 2E:
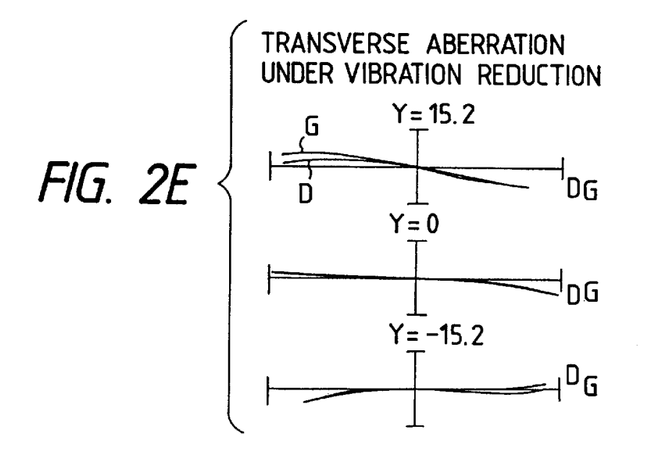
Figure 3A:
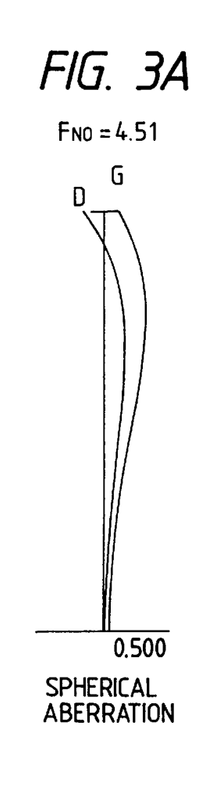
FIGS. 3A to 3E are graphs showing aberrations at the telephoto end in the first embodiment shown in FIG. 1.
Figure 3B:
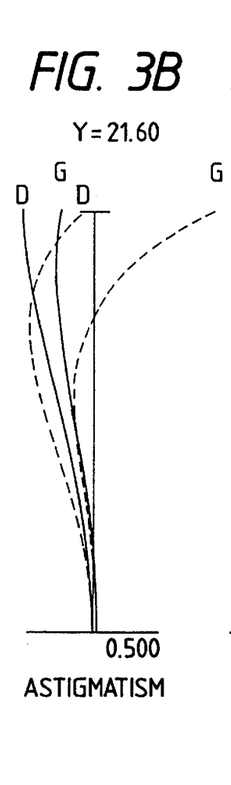
Figure 3C:
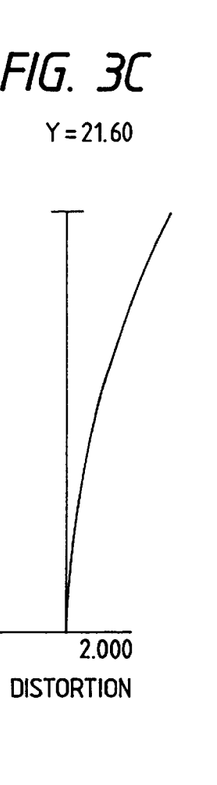
Figure 3D:
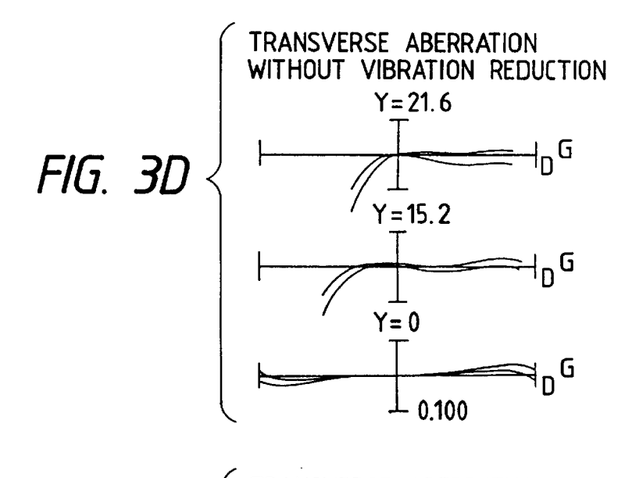
Figure 3E:
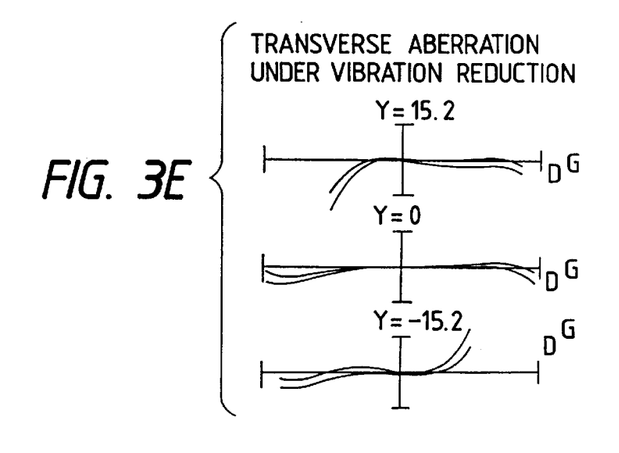

FIG. 1 is a view showing the arrangement of a zoom lens according to the first embodiment of the present invention. The zoom lens shown in FIG. 1 is constituted by, in the following order from the object side: a first lens group G1 consisting of a positive meniscus lens having a convex surface facing the object side, a negative meniscus lens having a convex surface facing the object side, a cemented lens of a biconcave lens and a positive meniscus lens having a convex surface facing the object side, and a positive meniscus lens having a convex surface facing the object side; a second lens group G2 consisting of a cemented lens of a negative meniscus lens having a convex surface facing the object side, a biconvex lens, and a negative meniscus lens having a concave surface facing the object side, and a positive meniscus lens having a convex surface facing the object side; a third lens group G3 consisting of a cemented lens of a positive meniscus lens having a concave surface facing the object side and a biconcave lens, and a biconcave lens; and a fourth lens group G4 consisting of a biconvex lens, a biconvex lens, and a negative meniscus lens having a concave surface facing the object side.

Note that an aperture stop S is arranged between the second and third lens groups G2 and G3, as shown in FIG. 1.

FIG. 1 shows the positional relationship among the lens groups at the wide-angle end. Upon zooming toward the telephoto end, the lens groups move along zoom paths indicated by arrows in FIG. 1. Note that the third lens group G3 is fixed in the optical axis direction upon zooming, and is appropriately moved by a vibration reduction mechanism 1 as displacement means in a direction substantially perpendicular to the optical axis, thereby correcting an image fluctuation caused by a vibration of the zoom lens.

In the first embodiment, the present invention is applied to a standard zoom lens for a still camera.

Table 1 below summarizes data values of the first embodiment of the present invention. In Table 1, f is the focal length, $F_{NO}$ is the f-number, 2ω is the field angle, and Bf is the back focus. Furthermore, numerals in the leftmost column represent the order of lens surfaces, r is the radius of curvature of each lens surface, d is the lens surface interval, n (D) and ν are respectively the refractive index and Abbe's number for the d-line (λ=587.6 nm), and n (G) is the refractive index for the g-line (λ=435.8 nm).

TABLE 1 f = 28.8 to 83.22
$F_{NO}$ = 3.52 to 4.51
2ω = 76.44° to 28.24°

| | r | d | ν | n(D) | n(G) |
|---|---|---|---|---|---|
| 1 | 149.9910 | 3.0000 | 60.35 | 1.62041 | 1.63310 |
| 2 | 323.9920 | 0.1000 | | | |
| 3 | 72.8590 | 1.7000 | 53.93 | 1.71300 | 1.72941 |
| 4 | 25.4490 | 8.1000 | | | |
| 5 | −579.7500 | 1.2000 | 49.45 | 1.77279 | 1.79232 |
| 6 | 34.1970 | 3.5000 | 25.50 | 1.80458 | 1.84634 |
| 7 | 59.8860 | 0.1000 | | | |
| 8 | 33.2270 | 2.4000 | 23.01 | 1.86074 | 1.91065 |
| 9 | 43.3009 | (d9 = variable) | | | |
| 10 | 36.6390 | 1.2000 | 23.01 | 1.86074 | 1.91065 |
| 11 | 22.6990 | 7.4000 | 70.41 | 1.48749 | 1.49596 |
| 12 | −29.7490 | 1.2000 | 40.76 | 1.58144 | 1.59968 |
| 13 | −55.3640 | 0.1000 | | | |
| 14 | 33.6520 | 3.6000 | 60.35 | 1.62041 | 1.63310 |
| 15 | −516.6524 | (d15 = variable) | | | |
| 16 | −104.8200 | 1.9000 | 26.05 | 1.78470 | 1.82451 |
| 17 | −32.6310 | 1.0000 | 64.10 | 1.51680 | 1.52669 |
| 18 | 4434.0000 | 1.2000 | | | |
| 19 | −52.6200 | 1.2000 | 60.69 | 1.56384 | 1.57529 |
| 20 | 37.0010 | (d20 = variable) | | | |
| 21 | 319.0000 | 5.5000 | 61.09 | 1.58913 | 1.60102 |
| 22 | −29.7490 | 0.1000 | | | |
| 23 | 92.7730 | 3.7000 | 56.66 | 1.61025 | 1.62364 |
| 24 | −76.5180 | 2.8000 | | | |
| 25 | −29.8100 | 1.2000 | 28.56 | 1.79504 | 1.83148 |
| 26 | −155.9450 | (Bf) | | | |

(Variable Interval Upon Zooming)

| f | 28.80 | 83.22 |
|---|---|---|
| d9 | 41.76003 | 1.28383 |
| d15 | 3.01227 | 20.81217 |
| d20 | 20.48832 | 2.68842 |
| Bf | 38.761 | 56.597 |

(Condition Corresponding Values)

fW = 28.80
fT = 83.22
f1 = −40.844
f2 = 30.600
f3 = −39.104
f4 = 57.026
R31 = −104.8200
L = 5.3
D = 16.4
Δ3 = 0
(1) f3/(fW · fT)$^{1/2}$ = 0.7988
(2) f2/|f1| = 0.7492
(3) ΔS3/|f3| = 0.0038
(4) R31/|f3| = −2.6805
(5) L/|f3| = 0.1355
(6) N− = 1.56384
(7) ν− = 60.69
(8) |f3|/f4 = 0.6857
(9) q− = −2.904
(10) ΔS3/D = 0.0091
(11) Δ3/(fW · fT)$^{1/2}$ = 0

(Vibration Reduction Data)

| | Wide-angle End | Telephoto End |
|---|---|---|
| Moving Amount of Third Lens Group in Direction Perpendicular to | 0.15 | 0.15 |

TABLE 1-continued

| | | |
|---|---|---|
| Optical Axis (mm) Moving Amount of Image (mm) | −0.199 | −0.256 |

(The negative sign indicates a direction opposite to the moving direction of the vibration reduction lens group.)

FIGS. 2A to 2E and FIGS. 3A to 3E are respectively graphs showing aberrations at the wide-angle end and the telephoto end. In these graphs, $F_{NO}$ is the f-number, Y is the image height, D is the d-line (λ=587.6 nm), and G is the g-line (λ=435.8 nm). In the graphs showing the astigmatism, a solid curve represents the sagittal image plane, and a broken curve represents the meridional image plane.

As can be seen from these graphs, according to this embodiment, the aberrations are satisfactorily corrected even under vibration reduction.

Second Embodiment

Figure 4:
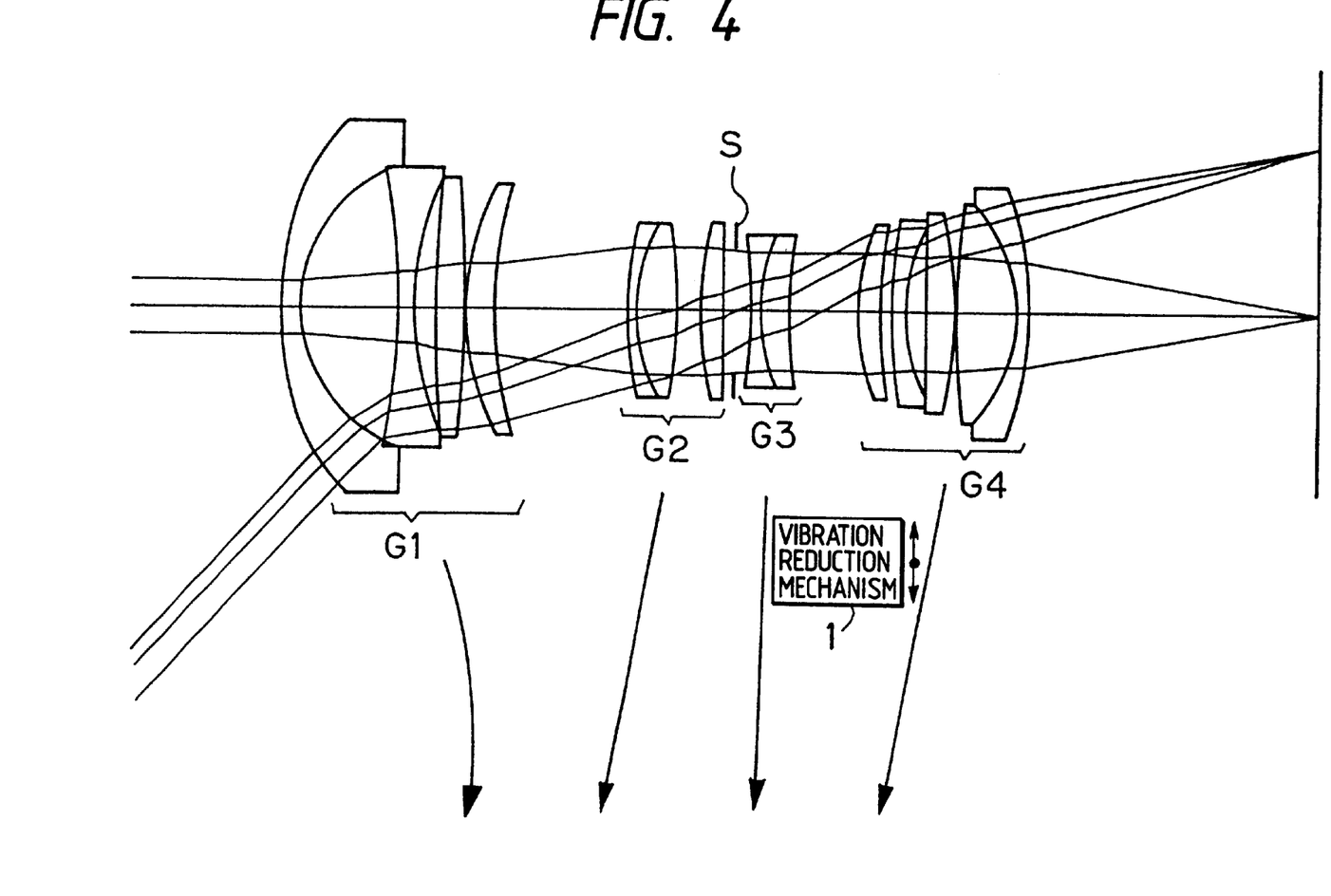
FIG. 4 is a view showing the arrangement of a zoom lens according to the second embodiment of the present invention.
Figure 5A:
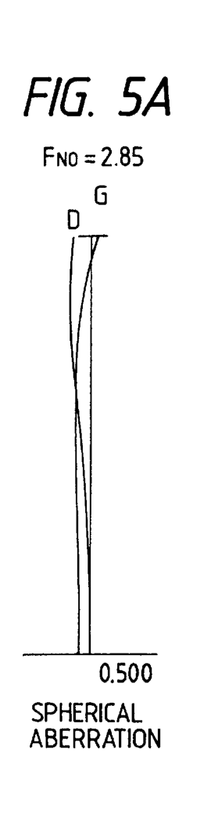
FIGS. 5A to 5E are graphs showing aberrations at the wide-angle end in the second embodiment shown in FIG. 4.
Figures 5B, 5C:
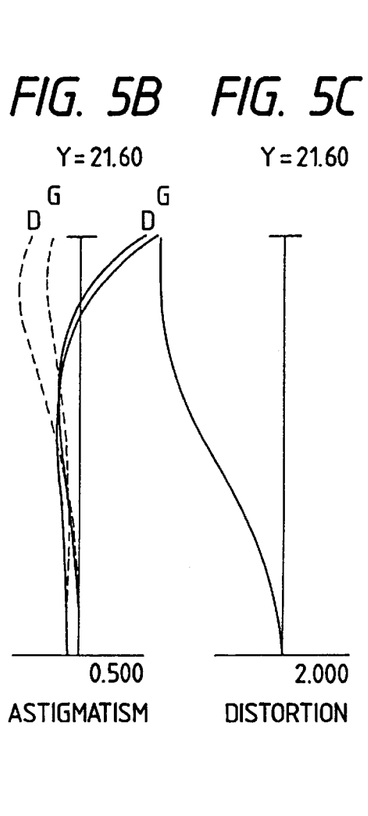
Figure 5D:
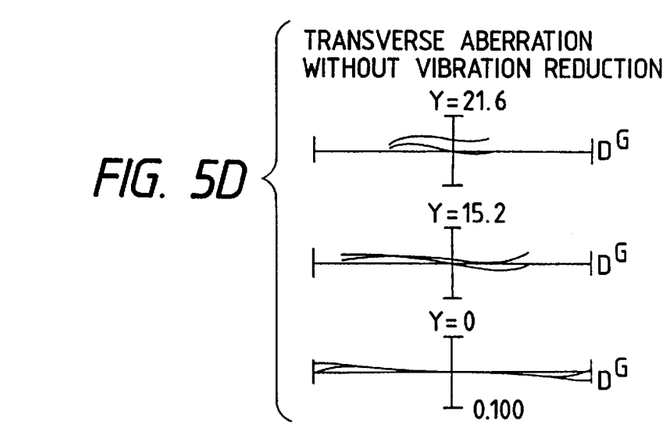
Figure 5E:
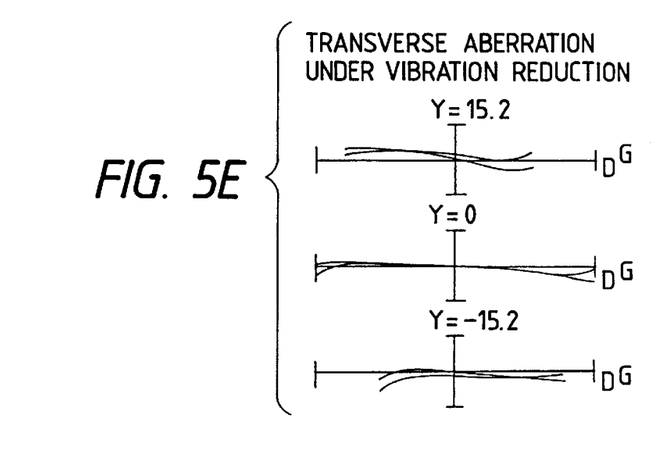
Figure 6A:
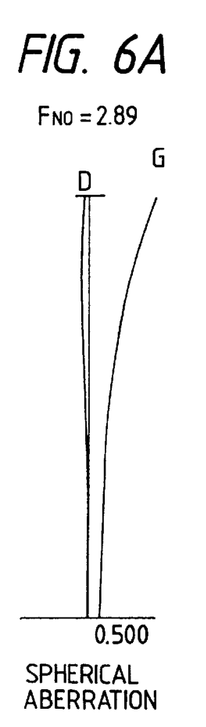
FIGS. 6A to 6E are graphs showing aberrations at the telephoto end in the second embodiment shown in FIG. 4.
Figure 6B:
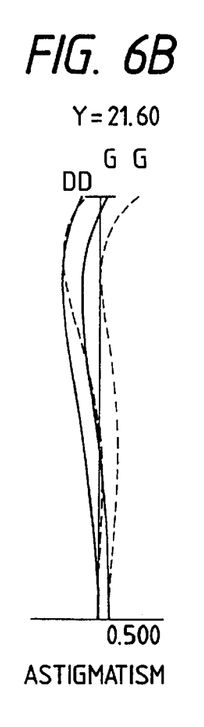
Figure 6C:
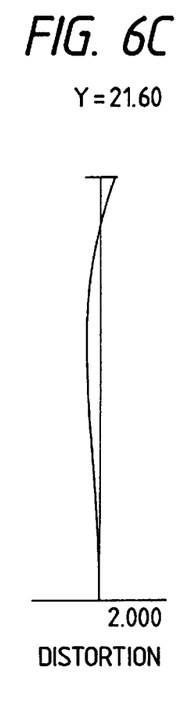
Figure 6D:
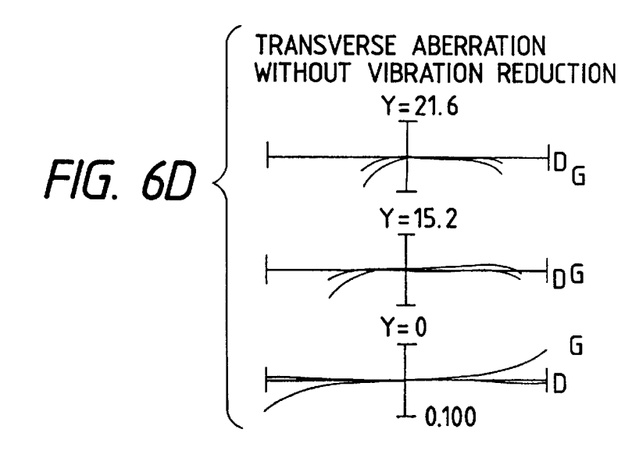
Figure 6E:
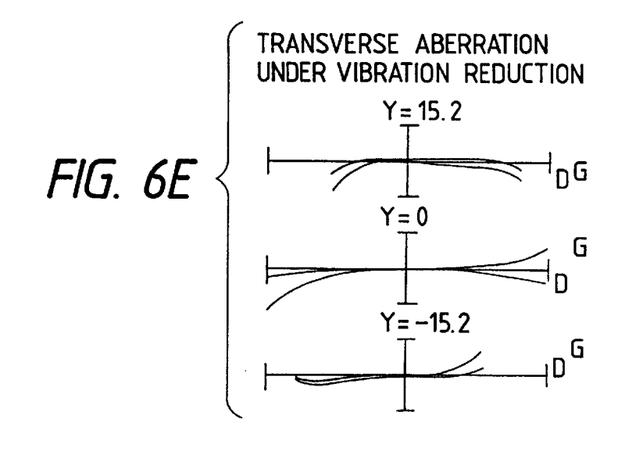

FIG. 4 is a view showing the arrangement of a zoom lens according to the second embodiment of the present invention. The zoom lens shown in FIG. 4 is constituted by, in the following order from the object side: a first lens group G1 consisting of a negative meniscus lens having a convex surface facing the object side, a biconcave lens, a biconvex lens, and a positive meniscus lens having a convex surface facing the object side; a second lens group G2 consisting of a cemented lens of a negative meniscus lens having a convex surface facing the object side and a biconvex lens, and a positive meniscus lens having a convex surface facing the object side; a third lens group G3 consisting of a cemented lens of a biconcave lens and a positive meniscus lens having a convex surface facing the object side; and a fourth lens group G4 consisting of a positive meniscus lens having a convex surface facing the object side, a negative meniscus lens having a convex surface facing the object side, a biconvex lens, and a cemented lens of a biconvex lens and a negative meniscus lens having a concave surface facing the object side.

Note that an aperture stop S is arranged between the second and third lens groups G2 and G3, as shown in FIG. 4.

FIG. 4 shows the positional relationship among the lens groups at the wide-angle end. Upon zooming toward the telephoto end, the lens groups move along zoom paths indicated by arrows in FIG. 4. Note that the third lens group G3 is appropriately moved by a vibration reduction mechanism 1 as displacement means in a direction substantially perpendicular to the optical axis, thereby correcting an image fluctuation caused by a vibration of the zoom lens.

In the second embodiment, the present invention is applied to a super wide-angle range zoom lens with a large aperture ratio for a still camera. The zoom lens of this embodiment has substantially the same basic arrangement as that of the zoom lens of the first embodiment, except for the refracting powers, shapes, and the like of the lens groups.

Table 2 below summarizes data values of the second embodiment of the present invention. In Table 2, f is the focal length, $F_{NO}$ is the f-number, 2ω is the field angle, and Bf is the back focus. Furthermore, numerals in the leftmost column represent the order of lens surfaces, r is the radius of curvature of each lens surface, d is the lens surface interval, n (D) and ν are respectively the refractive index and Abbe's number for the d-line (λ=587.6 nm), and n (G) is the refractive index for the g-line (λ=435.8 nm).

An aspherical surface is given by the following formula (b):

$$S(y)=(y^2/R)/[1+(1-k\cdot y^2/R^2)^{1/2}]+C_2\cdot y^2+C4\cdot y^4+C6\cdot y^6+C8\cdot y^8+C_{10}\cdot y^{10} \quad (b)$$

where y is the height from the optical axis in the direction perpendicular to the optical axis, S(y) is the displacement amount in the optical axis direction at the height y, R is the reference radius of curvature, k is a coefficient of cone, and $C_n$ is an n-th order coefficient of aspherical surface.

Also, a paraxial radius r of curvature of the aspherical surface is defined by the following formula (c):

$$r=1/(2\cdot C_2+1/R) \quad (c)$$

An aspherical surface in the data table of this embodiment is indicated by a mark*attached to the left side of the corresponding surface number.

TABLE 2 f = 20.5 to 34.0
$F_{NO}$ = 2.85 to 2.89
2ω = 95.24° to 64.64°

| | r | d | ν | n(D) | n(G) |
|---|---|---|---|---|---|
| *1 | 49.5289 | 2.5000 | 49.45 | 1.77279 | 1.79232 |
| 2 | 19.4095 | 13.0000 | | | |
| 3 | −82.4606 | 2.0000 | 47.47 | 1.78797 | 1.80879 |
| 4 | 38.9679 | 2.8000 | | | |
| 5 | 153.9449 | 4.0000 | 31.62 | 1.75692 | 1.78801 |
| 6 | −153.9449 | 0.2000 | | | |
| 7 | 34.8138 | 3.5000 | 31.62 | 1.75692 | 1.78801 |
| 8 | 51.6962 | (d8 = variable) | | | |
| 9 | 43.0163 | 1.2000 | 29.46 | 1.71736 | 1.74922 |
| 10 | 22.3590 | 5.5000 | 69.98 | 1.51860 | 1.52767 |
| 11 | −56.7508 | 3.3043 | | | |
| 12 | 48.3572 | 3.0000 | 53.93 | 1.71300 | 1.72942 |
| 13 | 434.2482 | (d13 = variable) | | | |
| 14 | −63.7697 | 1.2000 | 52.30 | 1.74810 | 1.76589 |
| 15 | 22.2500 | 4.0000 | 25.35 | 1.80518 | 1.84725 |
| 16 | 76.7021 | (d16 = variable) | | | |
| 17 | 28.7572 | 3.0000 | 50.84 | 1.65844 | 1.67474 |
| 18 | 68.4386 | 1.5000 | | | |
| 19 | 67.8965 | 2.0000 | 26.05 | 1.78470 | 1.82453 |
| 20 | 27.6436 | 2.5000 | | | |
| 21 | 2047.9031 | 4.0000 | 45.37 | 1.79668 | 1.81880 |
| 22 | −50.1414 | 0.2000 | | | |
| 23 | 105.9867 | 8.0000 | 57.03 | 1.62280 | 1.63639 |
| 24 | −20.3500 | 1.7000 | 23.01 | 1.86074 | 1.91065 |
| 25 | −44.6298 | (Bf) | | | |

(Variable Interval Upon Zooming)

| f | 20.50 | 34.00 |
|---|---|---|
| d8 | 17.80931 | 1.49721 |
| d13 | 3.60321 | 11.73891 |
| d16 | 9.14332 | 1.00762 |
| Bf | 38.597 | 50.219 |

(Aspherical Surface Data)

| | k | $C_2$ | $C_4$ |
|---|---|---|---|
| 1st Surface | 1.0000 | 0.0000 | 0.47800 × 10⁻⁵ |

| $C_6$ | $C_8$ | $C_{10}$ |
|---|---|---|
| 0.44680 × 10⁻⁸ | 0.76090 × 10⁻¹¹ | 0.12150 × 10⁻¹³ |

(Condition Corresponding Values)

fW = 20.5
fT = 34.0
f1 = −27.983
f2 = 34.963
f3 = −50.151

TABLE 2-continued f4 = 39.988
R31 = −63.7697
L = 5.2
D = 19.2
Δ3 = 3.487
(1) f3/(fW · fT)$^{1/2}$ = 1.900
(2) f2/|f1| = 1.249
(3) ΔS3/|f3| = 0.004
(4) R31/|f3| = −1.2716
(5) L/|f3| = 0.1037
(6) N− = 1.74810
(7) ν− = 52.30
(8) |f3|/f4 = 1.2542
(9) q− = −0.483
(10) ΔS3/D = 0.0104
(11) Δ3/(fW · fT)$^{1/2}$ = 0.132

(Vibration Reduction Data)

|  | Wide-angle End | Telephoto End |
|---|---|---|
| Moving Amount of Third Lens Group in Direction Perpendicular to Optical Axis (mm) | 0.20 | 0.20 |
| Moving Amount of Image (mm) | −0.172 | −0.209 |

(The negative sign indicates a direction opposite to the moving direction of the vibration reduction lens group.)

FIGS. 5A to 5E and FIGS. 6A to 6E are respectively graphs showing aberrations at the wide-angle end and the telephoto end. In these graphs, $F_{NO}$ is the f-number, Y is the image height, D is the d-line (λ=587.6 nm), and G is the g-line (λ=435.8 nm). In the graphs showing the astigmatism, a solid curve represents the sagittal image plane, and a broken curve represents the meridional image plane.

As can be seen from these graphs, according to this embodiment, the aberrations are satisfactorily corrected even under vibration reduction.

Third Embodiment

Figure 7:
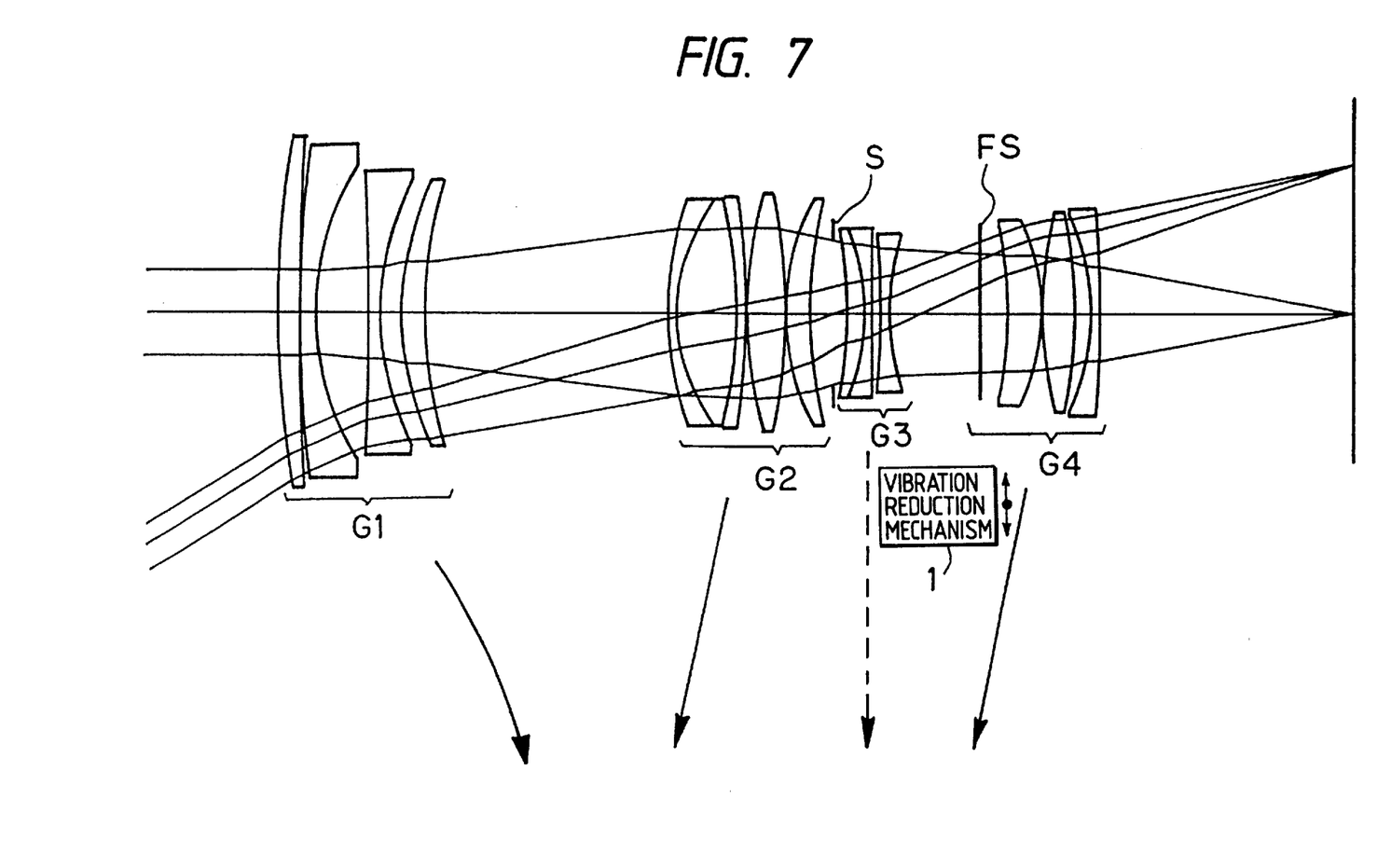
FIG. 7 is a view showing the arrangement of a zoom lens according to the third embodiment of the present invention.
Figure 8A:
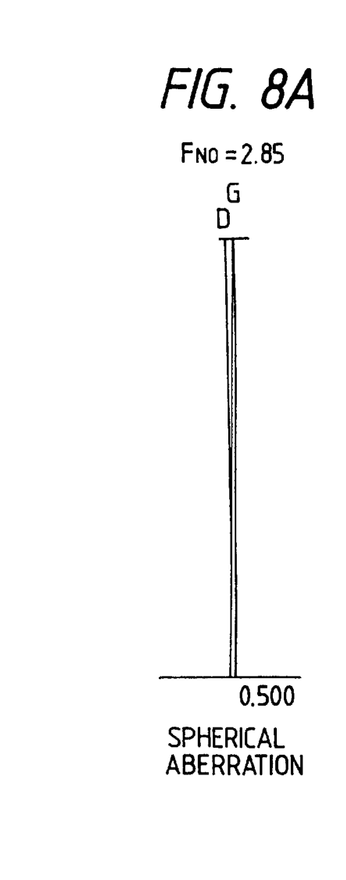
FIGS. 8A to 8E are graphs showing aberrations at the wide-angle end in the third embodiment shown in FIG. 7.
Figure 8B:
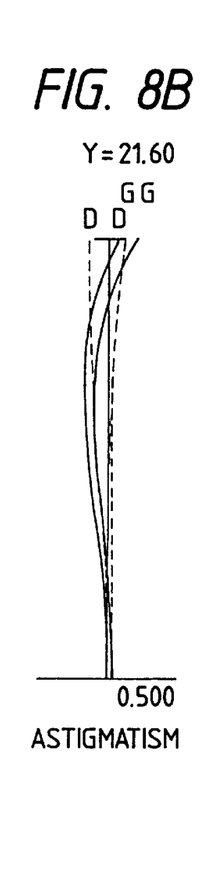
Figure 8C:
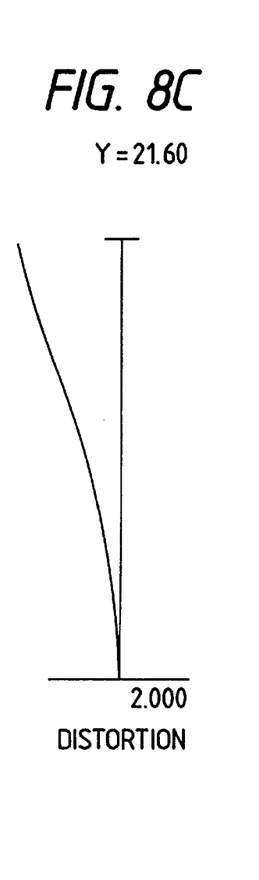
Figure 8D:
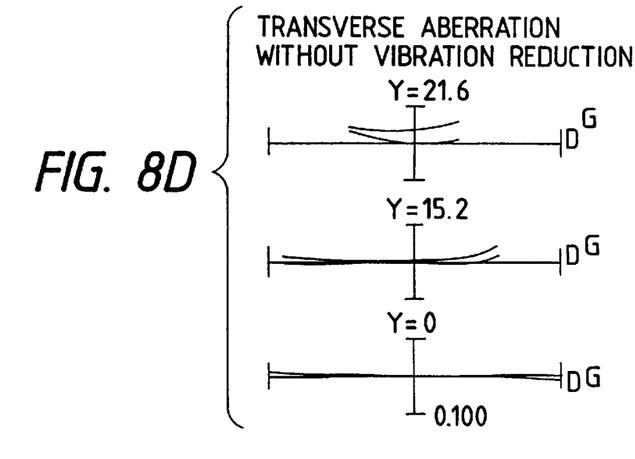
Figure 8E:
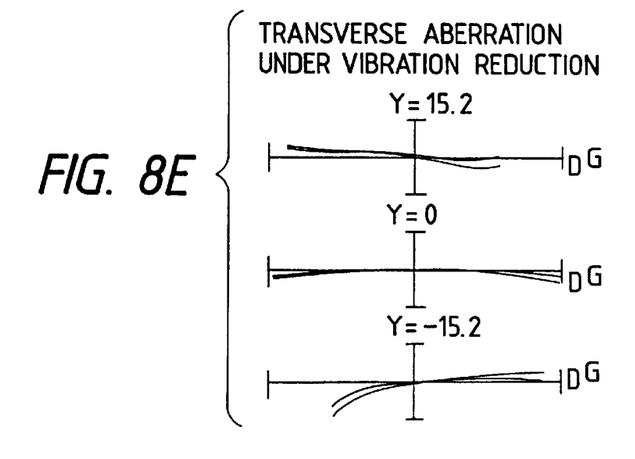
Figure 9A:
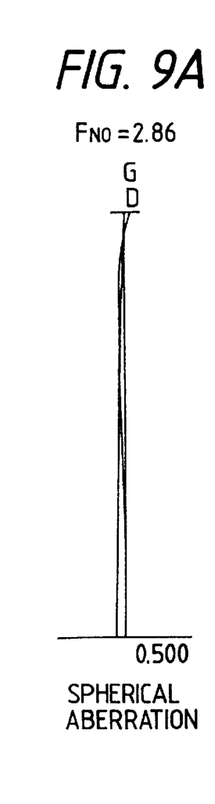
FIGS. 9A to 9E are graphs showing aberrations at the telephoto end in the third embodiment shown in FIG. 7.
Figure 9B:
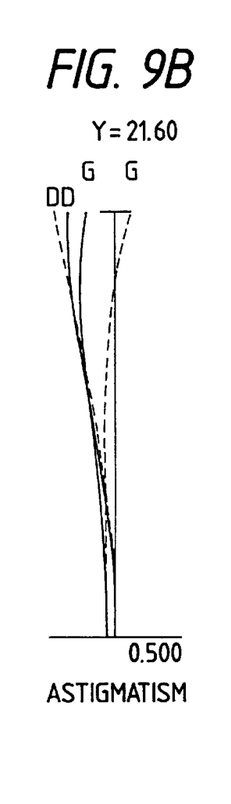
Figure 9C:
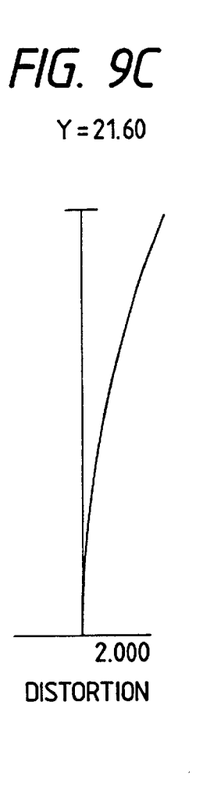
Figure 9D:
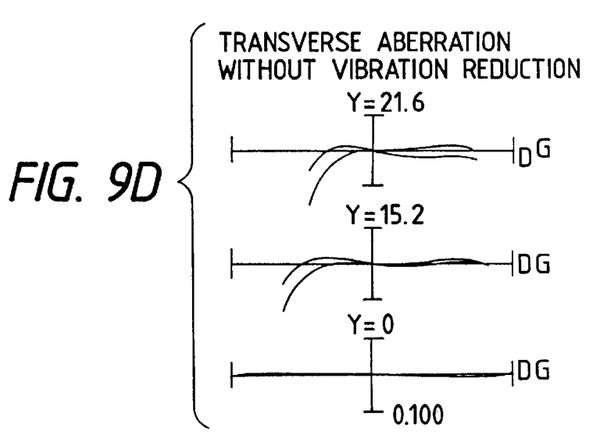
Figure 9E:
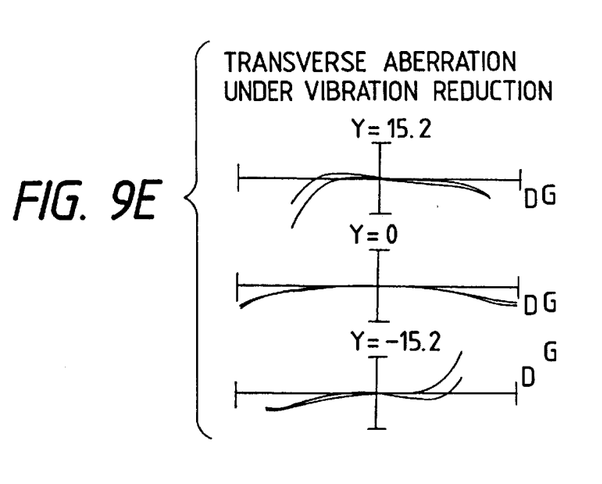

FIG. 7 is a view showing the arrangement of a zoom lens according to the third embodiment of the present invention. The zoom lens shown in FIG. 7 is constituted by, in the following order from the object side: a first lens group G1 consisting of a positive meniscus lens having a convex surface facing the object side, a negative meniscus lens having a convex surface facing the object side, a biconcave lens, and a positive meniscus lens having a convex surface facing the object side; a second lens group G2 consisting of a cemented lens of a negative meniscus lens having a convex surface facing the object side, a biconvex lens, and a negative meniscus lens having a concave surface facing the object side, a biconvex lens, and a positive meniscus lens having a convex surface facing the object side; a third lens group G3 consisting of a cemented lens of a positive meniscus lens having a concave surface facing the object side and a biconcave lens, and a biconcave lens; and a fourth lens group G4 consisting of a positive meniscus lens having a concave surface facing the object side, a biconvex lens, and a negative meniscus lens having a concave surface facing the object side.

Note that an aperture stop S is arranged between the second and third lens groups G2 and G3, as shown in FIG. 7, and a stationary flare stop FS is arranged between the third and fourth lens groups G3 and G4, as shown in FIG. 7.

FIG. 7 shows the positional relationship among the lens groups at the wide-angle end. Upon zooming toward the telephoto end, the lens groups move along zoom paths indicated by arrows in FIG. 7. Note that the third lens group G3 is fixed in the optical axis direction upon zooming, and is appropriately moved by a vibration reduction mechanism 1 as displacement means in a direction substantially perpendicular to the optical axis, thereby correcting an image fluctuation caused by a vibration of the zoom lens.

In the third embodiment, the present invention is applied to a zoom lens with a large aperture ratio for a standard range, and has substantially the same basic arrangement as that of the zoom lens of the first embodiment described above, except for the refracting powers, shapes, and the like of the lens groups.

Table 3 below summarizes data values of the third embodiment of the present invention. In Table 3, f is the focal length, $F_{NO}$ is the f-number, 2ω is the field angle, and Bf is the back focus. Furthermore, numerals in the leftmost column represent the order of lens surfaces, r is the radius of curvature of each lens surface, d is the lens surface interval, n (D) and ν are respectively the refractive index and Abbe's number for the d-line (λ=587.6 nm), and n (G) is the refractive index for the g-line (λ=435.8 nm).

TABLE 3 f = 36.0 to 68.5
$F_{NO}$ = 2.85 to 2.86
2ω = 63.5° to 34.2°

|  | r | d | ν | n(D) | n(G) |
|---|---|---|---|---|---|
| 1 | 149.4295 | 3.0000 | 25.50 | 1.80458 | 1.84634 |
| 2 | 398.3922 | 0.2000 |  |  |  |
| 3 | 214.5071 | 2.1000 | 57.53 | 1.67025 | 1.68466 |
| 4 | 39.0567 | 7.7000 |  |  |  |
| 5 | −720.3689 | 2.0000 | 57.53 | 1.67025 | 1.68466 |
| 6 | 42.9937 | 3.1000 |  |  |  |
| 7 | 42.4532 | 3.5000 | 23.01 | 1.86074 | 1.91065 |
| 8 | 65.3028 | (d8 = variable) |  |  |  |
| 9 | 44.0854 | 1.4000 | 23.01 | 1.86074 | 1.91065 |
| 10 | 27.1290 | 9.0000 | 70.41 | 1.48749 | 1.49596 |
| 11 | −70.4660 | 1.4000 | 25.50 | 1.80458 | 1.84634 |
| 12 | −113.6333 | 0.1000 |  |  |  |
| 13 | 56.6710 | 5.8000 | 70.41 | 1.48749 | 1.49596 |
| 14 | −77.8313 | 0.1000 |  |  |  |
| 15 | 34.8137 | 3.6000 | 60.23 | 1.51835 | 1.52897 |
| 16 | 71.4894 | (d16 = variable) |  |  |  |
| 17 | −60.8388 | 2.4000 | 23.01 | 1.86074 | 1.91065 |
| 18 | −32.4210 | 1.1000 | 69.98 | 1.51860 | 1.52766 |
| 19 | 680.4752 | 1.3000 |  |  |  |
| 20 | −111.6932 | 1.4000 | 69.98 | 1.51860 | 1.52766 |
| 21 | 40.4027 | (d21 = variable) |  |  |  |
| 22 | −64.1884 | 5.0000 | 61.09 | 1.58913 | 1.60102 |
| 23 | −29.0449 | 0.1000 |  |  |  |
| 24 | 56.9417 | 5.0000 | 60.14 | 1.62041 | 1.63314 |
| 25 | −64.3742 | 2.3000 |  |  |  |
| 26 | −32.8044 | 1.4000 | 25.50 | 1.80458 | 1.84634 |
| 27 | −142.6489 | (Bf) |  |  |  |

(Variable Interval Upon Zooming)

| f | 36.00 | 68.50 |
|---|---|---|
| d8 | 35.90188 | 2.80378 |
| d16 | 5.57243 | 16.43503 |
| d21 | 17.75710 | 6.79450 |
| Bf | 37.8905 | 48.7527 |

(Condition Corresponding Values)

fW = 36.00
fT = 68.50
f1 = −50.000
f2 = 34.000
f3 = −45.000
f4 = 64.995
R31 = −60.839
L = 6.2

TABLE 3-continued

D = 23.1
Δ3 = 0
(1) f3/(fW · fT)$^{1/2}$ = 0.9062
(2) f2/|f1| = 0.68
(3) ΔS3/|f3| = 0.0067
(4) R31/|f3| = −1.3520
(5) L/|f3| = 0.138
(6) N− = 1.51860
(7) ν− = 69.98
(8) |f3|/f4 = 0.6924
(9) q− = 0.90904
(10) ΔS3/D = 0.013
(11) Δ3/(fW · fT)$^{1/2}$ = 0

(Vibration Reduction Data)

| | Wide-angle End | Telephoto End |
|---|---|---|
| Moving Amount of Third Lens Group in Direction Perpendicular to Optical Axis (mm) | 0.30 | 0.30 |
| Moving Amount of Image (mm) | −0.346 | −0.387 |

(The negative sign indicates a direction opposite to the moving direction of the vibration reduction lens group.)

FIGS. 8A to 8E and FIGS. 9A to 9E are respectively graphs showing aberrations at the wide-angle end and the telephoto end. In these graphs, $F_{NO}$ is the f-number, Y is the image height, D is the d-line (λ=587.6 nm), and G is the g-line (λ=435.8 nm). In the graphs showing the astigmatism, a solid curve represents the sagittal image plane, and a broken curve represents the meridional image plane.

As can be seen from these graphs, according to this embodiment, the aberrations are satisfactorily corrected even under vibration reduction.

As described above, according to the present invention, a compact, high-performance zoom lens which has a vibration reduction function and is suitable for a still camera, a video camera, and the like, can be provided.

The zoom lens of the present invention is especially suitable for a zoom lens from a normal range to a wide-angle range for a still camera.

What is claimed is:

1. A zoom lens comprising in the following order from the object side:

a first lens group having a negative refracting power;

a second lens group having a positive refracting power;

a third lens group having a negative refracting power;

a fourth lens group having a positive refracting power; and displacement means for attaining vibration reduction by moving said third lens group or a partial lens group in said third lens group in a direction substantially perpendicular to an optical axis, wherein when zooming is effected from a wide-angle end to a telephoto end, an interval between said first and second lens groups decreases, an interval between said second and third lens groups increases, and an interval between said third and fourth lens groups decreases, and said zoom lens satisfies the following condition:

$$0.2 < |f3|/(fW \cdot fT)^{1/2} < 5$$

where f3 is the focal length of said third lens group, fW is the focal length of the entire lens system at the wide-angle end, fT is the focal length of the entire lens system at the telephoto end, said zoom lens further comprising a stationary flare stop which is arranged around the optical axis and shields unnecessary rays upon movement of said third lens group in the direction substantially perpendicular to the optical axis for vibration reduction.

* * * * *